Jan. 9, 1968 L. G. FORTINOV 3,362,618
DEVICE FOR INCREASING PRESSURE OF WORKING MEDIUM
Filed Oct. 18, 1965 2 Sheets-Sheet 1

United States Patent Office 3,362,618
Patented Jan. 9, 1968

3,362,618
DEVICE FOR INCREASING PRESSURE OF
WORKING MEDIUM
Leonid Grigorievich Fortinov, 10-Per. 112, Apt. 66,
Taganrog, U.S.S.R.
Filed Oct. 18, 1965, Ser. No. 496,771
4 Claims. (Cl. 230—52)

ABSTRACT OF THE DISCLOSURE

The invention comprises a device for increasing the pressure of a fluid working medium, particularly a gaseous medium, and includes a body having aligned cylinders of different diameters, each accommodating a unitary differential piston arrangement constituting a plunger pump and motor, valve controlled inlet and outlet connections for working fluid, the pressure of which is to be increased, associated with the cylinder accommodating the pump and inlet and outlet connections for driving the motor including a connection to the source under pressure and a control mechanism with motor including a valve having an end face for closing the exhaust and a peripheral surface for closing the inlet connection to the working chamber of the motor and co-operating abutment surfaces operably associated with the valve and motor piston to initiate movement of the valve approximately near the end of the working stroke of the plunger.

---

Figure 1:
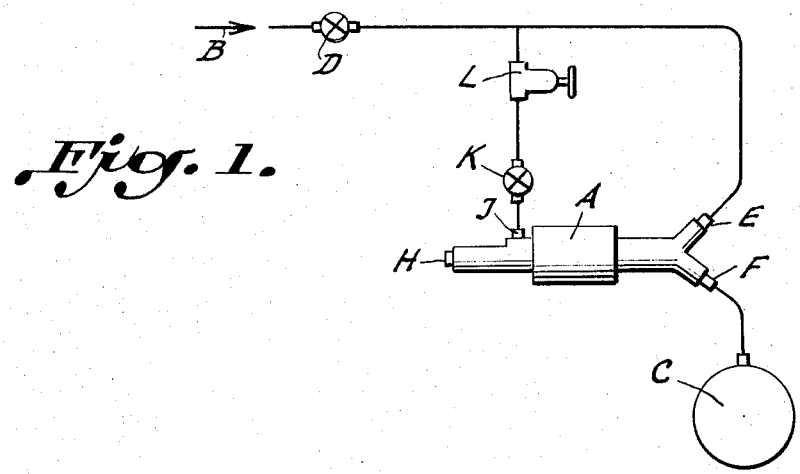

This invention relates to devices for increasing the pressure of the working medium, mainly compressed gases, and more particularly to devices for increasing the pressure in a continuous-cyclic manner.

Devices are known for increasing the pressure of compressed gases by means of a plunger pump which communicates with a source of compressed gas and with the gas consumer at an increased pressure; said pump being provided with a pneumatic drive which comprises a motor with an actuating mechanism and means effecting automatic control thereof.

The actuating mechanism of the pneumatic motor of conventional devices is made in the form of a moving piston or plunger which is utilized as the moving sleeve of the plunger pump being employed at the same time for returning said actuating mechanism to the initial position under the action of compressed gas.

Such design of the plunger pump is not advantageous since it is necessary to shift the sleeve of a greater mass as compared with the mass of the pump plunger, and it is also difficult to align the outer and inner cylindrical surfaces of said plunger.

The means for automatic control of the drive in conventional devices comprises electro-pneumatic valves which are arranged outside of the body of the device and communicate with the drive by means of pipe lines.

The employment of electro-pneumatic valves decreases the reliability of conventional devices, makes them rather bulky and, in addition, requires a source of electric power resulting in a narrowing of the field of application of said devices, for example, in explosion-hazardous premises.

It is an object of the present invention to eliminate the above mentioned disadvantages.

The specific object of the invention is to provide a device for increasing the pressure of the working medium, mainly compressed gas, which is of more simple and compact design as compared with the known devices of similar type, and which will ensure reliable operation employing the energy of pressure only, preferably of said working medium.

Said objects are attained by employing a device for increasing the pressure of the working medium, mainly compressed gas, which comprises a plunger pump connected to the working medium source and to the consumer of said working medium under increased pressure, and a drive, preferably a pneumatic drive comprising a motor with an actuating mechanism and a means for automatic control of said mechanism, in which, according to the invention the plunger pump and the drive arranged in one body, the plunger of said plunger pump being employed for the return of said actuating mechanism to the initial position under the action of pressure of the working medium whilst the means for automatic control of the motor is fitted in the working space thereof and provided with the valve, the body and end of which serve as an inside combination valve for periodically overlapping or closing the inlet and outlet holes for the working medium which is employed for actuating the drive under the action of the actuating mechanism of the motor and under the pressure of said working medium.

The valve of said means for the automatic control of the motor is spring-loaded and provided with a shank with a stop and a shock absorber, cooperating with the actuating mechanism of the motor.

When employing compressed gas as the working medium of the drive and the plunger pump, the parts of the body which enclose the plunger pump and the means for automatic control of the motor respectively, are provided with housings whilst the spaces which are formed between the body and the housings communicate by means of pipe lines which makes it possible to use the compressed gas let out of the working space of the motor for cooling the plunger pump and for subsequent warming up of said means.

Thus, said device for increasing the pressure of the working medium ensures reliable functioning of the motor employing the pressure only, preferably of said working medium.

Figure 2:
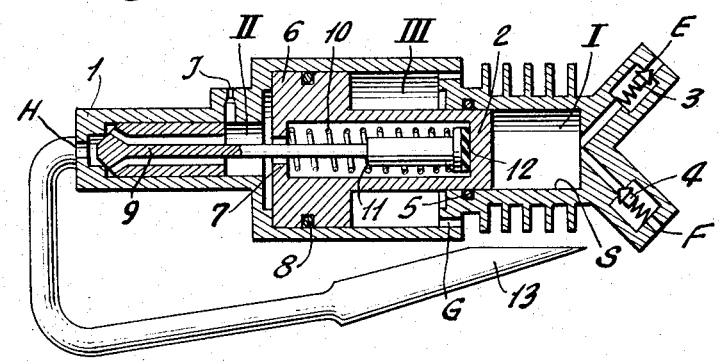
Figure 6:
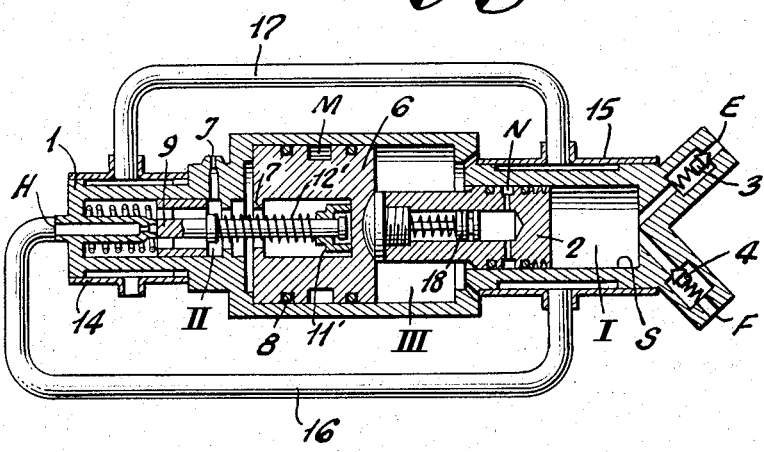
Figure 3:
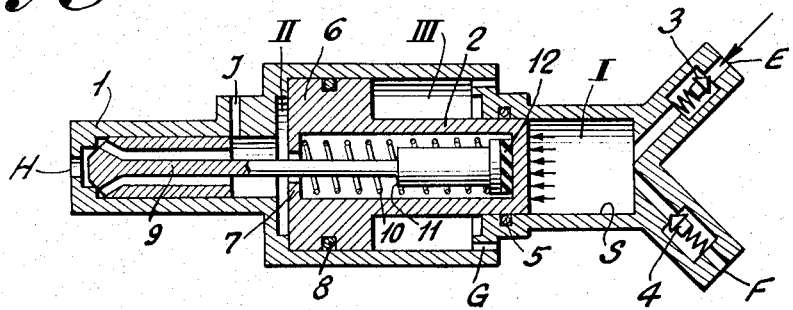
Figure 4:
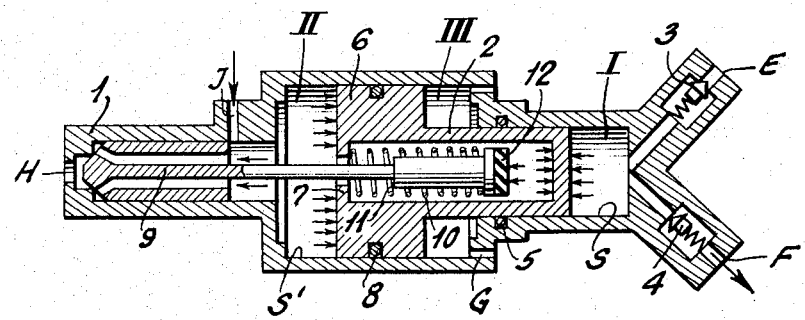
Figure 5:
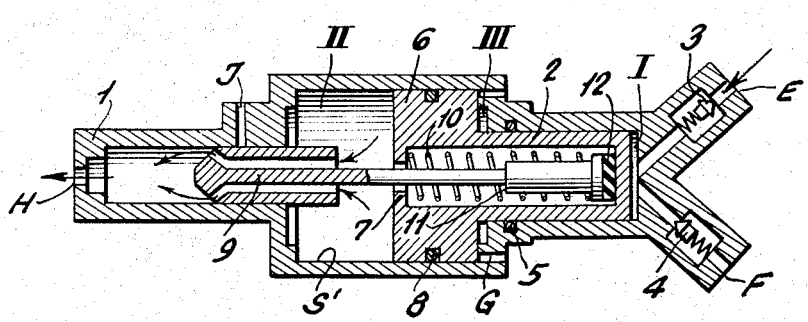

The invention will become more fully apparent upon reading the description given below and the accompanying drawings, wherein:

FIGURE 1 is a diagrammatic view illustrating the arrangement of the invention interposed between a source of working medium under pressure and a consumer device for utilizing such medium at an increased pressure, FIGURE 2 is a diagrammatic longitudinal sectional view illustrating the component parts of the device of the invention for increasing the pressure between source and the consumer, FIGURE 3 is a view similar to FIGURE 1 and illustrating the component parts in the position when the actuating mechanism of the motor is in an initial position, FIGURE 4 is a view similar to FIGURE 3 diagrammatically illustrating the component parts at the position occupied during the working stroke of the actuating mechanism of the motor, FIGURE 5 is a view similar to FIGURE 4 illustrating the position of the component parts at the end of the working stroke of the motor actuating mechanism, and FIGURE 6 is a diagrammatic view in longitudinal section illustrating a modified arrangement of parts including the addition of a heat exchange circuit.

Device A (FIG. 1) for increasing the pressure of the working medium is inserted between source B of the working medium and consumer C under an increased pressure of said medium.

When valve D is opened the working medium, which is under pressure, flows from source B through pipes and through non-return valves arranged within pipe connections E and F of device A and fills up the space of consumer C. Under such conditions the pressure within the space of consumer C will be equal to the pressure of the working medium contained in source B.

The plunger pump and the drive which comprises the motor and the device for the automatic control of the latter are incorporated in body 1 of device A (FIG. 2).

The plunger pump is composed of a cylinder or sleeve S machined in body 1 and plunger 2, which form space I of the pump, as well as pipe connections E and F in which are respectively mounted non-return valve 3 for the inlet of the working medium supplied by the source into space I of the pump and non-return valve 4 for the outlet of the working medium of space I of the pump to the consumer. The sealing between plunger 2 and the sleeve is ensured by means of packing 5.

The motor of the drive comprises a sleeve which is machined in body 1 and an activating mechanism which is in the form of plunger 6 provided with clip 7 forming working space II of the motor as well as space III which is in communication with the surrounding atmosphere via holes G.

Plunger or piston 6 of the motor is made integral with plunger or piston 2 of the pump and is in the form of a single differential piston. The sealing between plunger 6 and the sleeve is ensured by means of packing 8.

The means for the automatic control of the motor is incorporated in the working space II of the motor and comprises another cylinder or sleeve S' machined in body 1 and a valve 9 whose body and end each function as a valve and a spring 10.

The sleeve S' of the means for automatic control of the motor incorporates pipe connection H provided with the seat for the end of valve 9 and a hole for the outlet of the working medium, which is utilized for actuating the drive, from space II into the surrounding medium, as well as pipe connection J provided with the hole for the inlet of the working medium from the source into space II.

The diameter of the hole in pipe connection J is considerably smaller than the diameter of the hole in pipe connection H. Valve 9 is provided with a shank which has stop 11 (or stop 11' as in FIG. 6) and shock absorber 12 (or shock absorber 12' as in FIG. 6).

When cock K is opened (FIG. 1) the working medium from source B enters working space II (FIG. 2) of the motor, via pipe lines, reducing valve L, cock K and the hole machined in pipe connection J.

Device A starts to function continuously supplying the working medium under an increased pressure into the space of consumer C.

Device A functions in the following manner.

The working medium, which is delivered into space I of the pump from said medium source via the pipe lines and non-return valve 3 applies pressure to plunger 2 which in its turn forces plunger 6 of the motor to occupy the extreme left position (FIG. 3). Valve 9 is pressed against the seat machined in pipe connection H by plunger 6, which bears against the former via shock absorber 12. Working space II of the motor is sealed, whilst space 1 of the pump is filled up with the working medium. When the working medium is delivered into space II of the motor, via the inlet hole which is machined in pipe connection J, the pressure within this space becomes greater and valve 9 is pressed against the seat by the increased effort due to the difference in pressure between space II and the surrounding medium. Under such conditions the value of increased effort becomes greater than the maximum effort exerted by spring 10.

Since the area of plunger 6 is greater than that of plunger 2 and as space III is in communication with the surrounding medium, plunger 6 will start to move to the right (FIG. 4) under the action of the pressure of the working medium which is delivered into space II. Under this condition said plunger will shift plunger 2. Plunger 2 compresses the working medium contained within space I of the pump, thus increasing the pressure of said working medium.

The travel of plunger 6 to the right is the working stroke of the motor actuating mechanism.

Due to increase of the pressure within space I, return valve 3 is forced to be closed whilst return valve 4 becomes opened and the working medium, under increased pressure, is forced out of space I into the pipe line which is in communication with the consumer.

During the working stroke valve 9 remains pressed against the seat by the pressure exercised by the working medium which is contained within space II. At the termination of the working stroke (FIG. 5) clip 7, bearing against stop 11, lifts valve 9 from its seat. Due to the fact that the diameter of the inlet hole for the working medium is considerably smaller than the diameter of the outlet hole for the working medium, and since the space between the seat of valve 9 and said hole is rather small, the slight lifting of valve 9 above the seat will result in equalized pressure applied to valve 9 from the side of space II and from the side of the hole which is machined in pipe connection H. Spring 10 forces valve 9 to the right thus fully opening the hole for the outlet of the working medium out of space II into the surrounding medium, the valve inside surface simultaneously overlapping the inlet hole for the working medium thus limiting its delivery from the source into space II of the motor. The pressure of the working medium which is contained within space II, due to its bleeding into the surrounding medium via the hole machined in the body of valve 9 and via the hole machined in pipe connection H, drops down and plunger 6 starts to travel to the left under the pressure applied to plunger 2 by the working medium which is contained within space I of the pump. As plunger 6 travels to the left the pressure within space I starts to drop down, valve 4 becomes closed, and valve 3 is opened and passes the working medium from the source into space I; due to this plunger 2 and plunger 6 are shifted to the left through the entire stroke. The return stroke of the actuating mechanism—plunger 6—of the motor takes place under the action of plunger 2 of the pump. At the termination of the left stroke, valve 9 is pressed against the seat under the action of plunger 6 and via shock absorber 12 and the shank provided with stop 11, thus sealing space II and opening the hole which is machined in pipe connection J for the inlet of the working medium into space II of the motor. This completes the operating cycle of device A and a new cycle commences.

Device A functions in the continuous-cyclic manner creating the required pressure within the space of consumer C.

Device A can be switched off manually by means of closing cock K (FIG. 1). It is advisable to insert reducing valve L into the system mainly when employing compressed gas for actuating the drive of device A, since this will reduce the gas consumption and allow to vary the rate of pressure increase when adjusting reducing valve L.

When employing compressed gas as the working medium of the pump and the drive, the gas which is discharged out of the working space of the motor and which is at a low temperature is directed via pipe line 13 to cool down the ribbed portion of pump body 1 (FIG. 2).

To improve thermal conditions when operating the device for automatic control of the motor with the employment of compressed gas under high pressure (up to 180 kg./cm.$^2$) to actuate device A, the gas which is discharged out of the working space of the motor is directed to cool down the pump portion of the body and then is directed to warm up the portion of the body which houses said device. Under such conditions, body 1 is provided with housings 14 and 15 (FIG. 6) interconnected by means of pipe lines 16 and 17.

The lubrication of the bearing surfaces can be effected from annular groove M machined in plunger 6 which is packed with the grease as well as by delivering such grease under pressure created by spring-loaded plunger 18, into annular groove N machined in the plunger of pump 2 (FIG. 6).

The drive of the device for increasing the pressure of the working medium can be operated either by the source of said working medium or by the source of any other fluid media under pressure.

The actuating mechanism of the motor can be made as a plunger as was described above or in the form of a diaphragm.

The device for increasing the pressure of the working medium can be inserted either in parallel, in order to increase the output, or in series, to increase the rate of pressure rise.

What I claim is:

1. In a device for increasing the pressure of a fluid working medium flowing between a source of medium under pressure and a consumer for such medium under pressure, a body means having axially aligned cylinders of different diameters, a differential piston arrangement moxable within said cylinders, means providing communication between the source and the smaller cylinder including a valve opening only toward said smaller cylinder, means providing communication between said smaller cylinder and the consumer including a valve opening only toward said consumer, said larger cylinder having an exension of reduced diameter, said differential piston having an axial bore therein in communication with said extension, said extension having an outlet opening in the end thereof remote from said smaller cylinder, an inlet opening of less diameter than said first-mentioned opening laterally communicating with the interior of the larger cylinder through the wall of said extension, a bypass communication between said source and said last-mentioned opening for admitting working medium under pressure into the space behind the larger of said pistons, and a valve including an end and a body slidably arranged within the extension with the end cooperating with the first-mentioned opening at the end of the extension and the body cooperating with the second mentioned opening in the wall of the extension, and said valve further having at least one axial bore therethrough whereby to control the flow of fluid into and out of the space behind the larger surface of said differential piston.

2. The device as claimed in claim 1 further including spring means acting on said valve to normally move the same to open said first-mentioned opening and cooperating abutment means carried respectively by said valve steam and differential piston for initiating opening movement of the valve to expose said first-mentioned opening whereupon pressure on both sides of the valve will be equalized due to difference in diameter between the first-mentioned opening and the second mentioned opening in the extension so that the spring will force the valve to move to fully expose the first-mentioned opening and fully close the second mentioned opening.

3. The device as claimed in claim 1 further including a housing surrounding the smaller cylinder and said extension respectively, a conduit communicating between the first-mentioned opening in the end of the extension and the first-mentioned housing, another conduit communicating between the first-mentioned housing and the housing surrounding the extension, said last-mentioned housing having an outlet therein whereby medium discharged from the extension cools the smaller cylinder and transmits the heat extracted to the extension to warm the same.

4. The device as claimed in claim 1 further including shock absorbing means operatively related between the end of the valve stem and the interior end surface of the bore within said differential piston.

References Cited

UNITED STATES PATENTS

| 217,626 | 7/1879 | Lyman | 103—50 |
| 2,539,292 | 1/1951 | Anderson | 230—52 |
| 2,751,144 | 6/1956 | Troendle | 230—52 |

ROBERT M. WALKER, *Primary Examiner.*